US006982296B2

(12) United States Patent
Keller et al.

(10) Patent No.: US 6,982,296 B2
(45) Date of Patent: Jan. 3, 2006

(54) PVB FILM CONTAINING A PLASTIFYING AGENT

(75) Inventors: Uwe Keller, Siegburg (DE); Holger Stenzel, Hennef (DE)

(73) Assignee: Kuraray Specialities Europe GmbH, Frankfurt (DE)

(*) Notice: Subject to any disclaimer, the term of this patent is extended or adjusted under 35 U.S.C. 154(b) by 0 days.

(21) Appl. No.: 10/481,238

(22) PCT Filed: Jun. 19, 2002

(86) PCT No.: PCT/DE02/02231

§ 371 (c)(1),
(2), (4) Date: Aug. 12, 2004

(87) PCT Pub. No.: WO02/102591

PCT Pub. Date: Dec. 27, 2002

(65) Prior Publication Data

US 2004/0249068 A1    Dec. 9, 2004

(30) Foreign Application Priority Data

Jun. 19, 2001 (DE) .............................. 101 29 422

(51) Int. Cl.
    B32B 9/04        (2006.01)
(52) U.S. Cl. ................... 524/315; 428/411.1; 428/437; 524/317; 525/61
(58) Field of Classification Search ............. 428/411.1, 428/437; 524/315, 317; 525/61
    See application file for complete search history.

(56) References Cited

U.S. PATENT DOCUMENTS

| 3,271,235 | A | * | 9/1966 | Mont et al. ................... 428/437 |
| 3,551,281 | A | * | 12/1970 | Ando et al. ................... 428/437 |
| 3,679,788 | A | * | 7/1972 | Kiyono et al. ............... 264/211 |
| 3,838,091 | A | * | 9/1974 | Kyoto et al. ................. 524/396 |
| 3,884,865 | A | * | 5/1975 | Fariss et al. ................. 524/314 |
| 4,020,217 | A | * | 4/1977 | Karasudani et al. ......... 428/429 |
| 4,276,351 | A | * | 6/1981 | Phillips ....................... 428/437 |
| 4,390,594 | A | * | 6/1983 | Dages ........................ 428/437 |
| 4,537,830 | A |   | 8/1985 | Hermann et al. |
| 4,942,102 | A |   | 7/1990 | Keys et al. |
| 5,190,826 | A | * | 3/1993 | Asahina et al. ............. 428/437 |
| 5,349,014 | A |   | 9/1994 | Degeilh |
| 6,270,938 | B1 | * | 8/2001 | Gandini et al. ............. 430/157 |
| 6,559,212 | B1 | * | 5/2003 | D'Errico et al. ............ 524/317 |

FOREIGN PATENT DOCUMENTS

EP        0324482        7/1989

* cited by examiner

*Primary Examiner*—Bernard Lipman
(74) *Attorney, Agent, or Firm*—Millen, White, Zelano & Branigan, P.C.

(57) ABSTRACT

The present invention relates to a plasticized foil based on a partially acetalized polyvinyl alcohol (PVB resin) and suitable as an intermediate layer in a laminated safety glass, and comprising:
  a) 60–85% by weight of PVB resin,
  b) 14–39% by weight of a plasticizer, and
  c) up to 10% by weight of one or more non-ionic surfactants as an additive increasing the solubility of the plasticizer in the PVB resin wherein all weight percents are based on the total foil.

16 Claims, No Drawings

PVB FILM CONTAINING A PLASTIFYING AGENT

TECHNICAL FIELD

The invention relates to a plasticized foil based on partially acetalized polyvinyl alcohols, in particular, based on PVB resin, and suitable as an intermediate layer in laminated safety glass. Laminated safety glass is generally composed of two glass panes and of an adhesive foil bonding the glass panes. The adhesive foil used in the great majority of instances is a foil composed of plasticized partially acetalized polyvinyl alcohols, in particular of polyvinyl butyral (PVB). The laminated safety glass mentioned at the outset is used, by way of example, as windshields or side glazing in the vehicle sector, or else as safety glazing in the construction sector.

Plasticizers used commercially for PVB in conventional PVB foils are mainly aliphatic diesters of tri- or tetraethylene glycols. Among these are 3 GH, 3G7, 3G8, and also 4G7, the prefixed numeral in the these referring to the number n of repeat units H—(O—CH$_2$—CH$_2$)$_n$—OH of the oligoethylene glycol fraction, H referring to 2-ethylbutyrate, 7 to n-heptanoate, and 8 to 2-ethylhexanoate. Other known plasticizers for polyvinyl butyral are, inter alia, dialkyl adipates with aliphatic or cycloaliphatic ester fractions, dialkyl sebacates, triorganophosphates, triorganophosphites, or phthalate plasticizers, such as benzyl butyl phthalate.

Some plasticizers have only limited compatibility with PVB resins. If compatibility is insufficient, bleed-out of the plasticizer is observed, in particular on heat-aging, and on aging in a moist atmosphere. The compatibility of plasticizers generally falls as the polar character of the plasticizer decreases— relatively high-polarity plasticizers having better compatibility the PVB—and rises as the polyvinyl alcohol (PVOH) content of the PVB resin decreases.

PRIOR ART

It has previously been proposed that triethylene glycol di-2-ethylhexanoate—abbreviated to 3G8 or 3GEH—could be used as a plasticizer for polyvinyl butyral foils (PVB foil) in order to obtain products with better moisture resistance. However, the apolar character of 3G8 gives it only low compatibility with PVB.

EP 0 877 665 B1 describes the use of 3G8 as plasticizer in PVB foil for laminated safety glass, the PVOH content of the PVB resin used here having to be below 19.5% by weight. If that is not the case, incompatibility causes bleed-out of the plasticizer. The use of PVB resins with PVOH contents above 19.5% by weight is therefore not possible. Furthermore, comparative experiments show that even if the PVOH content of the PVB resin used is 18.9% by weight the compatibility limit for 3G8 is between 28.5 and 30.5% by weight when the foil has been exposed over a long period to an atmosphere whose relative humidity is 98% at 23° C.

However, PVB resins suitable for PVB foils and having a PVOH content below 19.5% by weight have low commercial availability.

OBJECT

It is therefore an object of the present invention to provide a plasticized foil based on partially acetalized polyvinyl alcohols (PVB resin) which is suitable as an intermediate layer in laminated safety glass and which does not have these disadvantages.

DESCRIPTION OF THE INVENTION

The invention achieves this object by way of a foil having the features of claim 1, preferably combined with one or more features of the subclaims.

The essence of the invention is the use of one or more non-ionic surfactants as an additive increasing the solubility of compatibility of a low-polarity plasticizer in the PVB resin.

The inventive plasticized foil based on partially acetalized polyvinyl alcohols (PVB resin) and suitable as an intermediate layer in laminated safety glass comprises from 60 to 85% by weight of PVB resin, from 14 to 39% by weight of low-polarity plasticizer, and up to 10% by weight of one or more non-ionic surfactants as an additive increasing the solubility of the low-polarity plasticizer in the PVB resin. Besides these, the foil may comprise other additives known to the person skilled in the art, for example residual amounts of water, or else the typical additives known to the person skilled in the art, such as UV absorbers, antioxidants, adhesion regulators, optical brighteners, stabilizers, processing aids, surface-active substances, etc.

Besides the low-polarity plasticizer, use may also be made of standard higher-polarity plasticizers. The greatest advantages result from the inventive addition of the non-ionic surfactant if the amount of low-polarity plasticizer used in the PVB foil is incompatible with the PVB resin without addition of the non-ionic surfactant.

For the quantitative assessment of plasticizer compatibility, or to determine whether a particular amount used of a plasticizer in a particular mixing specification is within or outside the compatibility limit, a standard test termed a spontaneous bleed-out test is used, this test being described in EP 0 877 665 B1=DE 696 09 992 T2. If the plasticizer loss in this test is less than 1% by weight, based on the plasticizer, the plasticizer is regarded as compatible, and if the plasticizer loss is more than 1% by weight it is regarded as incompatible. For rapid qualitative assessment of plasticizer compatibility it is sufficient to store a test strip of a PVB foil in a water-vapor saturated atmosphere. To obtain an atmosphere with high relative humidity (RH), a saturated aqueous solution of copper sulfate pentahydrate with undissolved solid is prepared in a closed vessel, e.g. a glass desiccator. The equilibrium moisture level over this solution at 23° C. equates to 98% RH. Absorption of water and the associated polarity increase can displace the plasticizer in low-compatibility systems, and the plasticizer migrates over the course of time to the foil surface, forming a clearly visible film or droplets. In compatible formulations, no plasticizer bleed can be detected on the test strip even after 30 days, whereas it is often apparent after as little as 24 h in the case of incompatible formulations.

The partially acetalized polyvinyl alcohol used preferably comprises a polyinyl butyral with a hydroxy group content greater than 19.5% by weight, calculated to ASTM D1396 as polyvinyl alcohol (PVOH), the abbreviated term polyvinyl alcohol content or PVOH content also being used in this application, because the advantage of the inventive addition of non-ionic surfactants can best be utilized with these resins. However, the use of the non-ionic surfactants also, in principle, improves the compatibility in PVB mixing specifications whose polyvinyl alcohol content is below 19.5% by weight.

In one preferred embodiment of the invention, the non-ionic surfactant used comprises a polyethoxylated aliphatic or aromatic alcohol containing at least 6 carbon atoms in the alcohol fraction, with an average degree of ethoxylation greater than or equal to 2. Particular preference is given to polyethoxylated aliphatic or aromatic alcohols containing from 8 to 20 carbon atoms in the alcohol fraction, with an average degree of ethoxylation of from 3 to 10.

Examples of non-ionic surfactants for the purposes of the invention are MARLOPHEN® NP 6, a nonylphenol whose average degree of ethoxylation is 6, MARLIPAL® O 13/40, a fatty alcohol whose average degree of ethoxylation is 4, ISOFOL® 12+5 EO, a 2-butyloctanol whose average degree of ethoxylation is 5, all products of Condea. Another example is Berol® 840, a narrowly distributed tetraethoxylated C8 alcohol from Akzo Nobel.

The amount preferably used of the non-ionic surfactant(s) is from 1 to 9% by weight, in particular from 2 to 4% by weight, based on the total foil mixture. The amount used of the non-ionic surfactant(s) should in all cases be at least sufficient to give complete solubility and therefore compatibility of the plasticizer or plasticizer mixture used in the selected mixing specification.

The ratio of low-polarity plasticizer to the non-ionic surfactant—based on the parts by weight in the foil—is preferably greater than 2.7:1, in particular greater than 3 and smaller than 10.

It is preferable to use triethylene glycol di-2-ethylhexanoate (3G8) as low-polarity plasticizer. However, the invention is not restricted to 3G8, but rather it is also possible to combine the non-ionic surfactants with other plasticizers whose apolar character makes the desired amount incompatible with the PVB resin used.

In this description, and in relation to polyvinyl butyral, the plasticizers regarded as low-polarity plasticizers are those whose solubility parameter δ at 25° C. is smaller than 8.60 $(cal/cm^3)^{1/2}$ or 17.59 $(J/cm^3)^{1/2}$. For simplicity, δ may be determined from what is known as the Small constants, these being tabulated in "Lösungsmittel und Weichmachungsmittel" [Solvents and plasticizers] (Volume 1, 8th edition, page 593, Gnamm/Fuchs, Wissenschaftliche Verlagsgesellschaft mgH Stuttgart 1980). By way of example, triethylene glycol di-n-heptanoate (3G7) has a δ of 8.71 $(cal/cm^3)^{1/2}$, while triethylene glycol di-2-ethylhexanoate (3G8) has a δ of 8.51 $(cal/cm^3)^{1/2}$.

The inventive plasticized foil based on partially acetalized polyvinyl alcohols (PVB resin) and suitable as an intermediate layer in laminated safety glass may be further processed with one or more panes of glass in the manner known to the person skilled in the art to give laminated safety glass either for the automotive sector or else for the construction sector.

Methods of Working the Invention and Comparative Experiments

For the inventive examples E1 to E10 and the comparative examples C1 to C8, plasticized PVB foils were produced in the manner known to the person skilled in the art on a commercially available extruder using a maximum melt temperature of 200° C., in order that their bleed-out performance could be tested.

The PVOH content of the PVB resin, the type of non-ionic surfactant used, and its amount were varied in the examples and comparative examples. Experiments were also carried out using 3G8 as the preferred apolar plasticizer incompatible with conventional PVB, and with 3G7 as a plasticizer having good compatibility with standard PVB. The results are presented in tables 1 and 2.

Plasticizer compatibility was determined qualitatively by the following test method: to determine bleed-out performance, a test strip is stored at 23° C. in a glass desiccator at 98% relative humidity. Absorption of water and the associated polarity increase can displace the plasticizer in low-compatibility systems, and the plasticizer migrates over the course of time to the foil surface, forming a clearly visible film or droplets. In compatible formulations, no plasticizer bleed can be detected on test strips even after 30 days, whereas it is often apparent as after as little as 24 h in the case of incompatible formulations. To obtain an atmosphere with high relative humidity (RH), a saturated aqueous solution of copper sulfate pentahydrate with undissolved solid is prepared in the glass desiccator. The equilibrium moisture level over this solution at 23° C. equates to 98% RH.

Example E1 used an amount of 4% by weight of MARLOPHEN® NP 6, a nonylphenol whose average degree of ethoxylation is 6, as non-ionic surfactant. The foil based on a PVB resin with a PVOH content of 20.3% by weight had 24% by weight content of 3G8 as plasticizer. Due to the inventive use of the hexaethoxylated nonylphenol as non-ionic surfactant, absolutely no plasticizer bleed-out was observed.

Examples E2 to E4 used similar mixing specifications with modified amounts of PVOH and of surfactant, the result likewise being absolutely no plasticizer bleed-out.

In contrast to this, a foil of comparative example C1 without surfactant addition exhibits considerable plasticizer loss after a short time, this resulting in visible plasticizer bleed-out.

The mixing specifications used in examples E5 to E10 were similar to those in examples E1 to E4 with other surfactants or amounts of surfactant, the result in each case being absolutely no plasticizer bleed-out. The products used were ISOFOL® 12+4EO, a 2-butyloctanol whose average degree of ethoxylation is 4, ISOFOL® 18T+6 EO, a singly branched aliphatic C18 alcohol whose average degree of ethoxylation is 6, MARLIPAL® O 13/40, a fatty alcohol whose average degree of ethoxylation is 4, MARLIPAL® O 13/60, a fatty alcohol whose average degree of ethoxylation is 6, ISOFOL® 12+5 EO, a 2-butyloctanol whose average degree of ethoxylation is 5, and finally Berol® 840, a narrowly distributed tetraethoxylated C8 alcohol.

Comparative example C2 demonstrated that the addition of 4% by weight of the standard plasticizer 3G7 instead of the non-ionic surfactant used according to the invention cannot prevent the bleed-out of the plasticizer 3G8.

Experiments C2 to C3 tested the compatibility limit with respect to amounts of 3G8 for a PVB with very low PVOH content of 18.9% by weight without the inventive addition of a non-ionic surfactant: above about 29% by weight 3G8 content, bleed-out of the plasticizer occurred.

Comparative examples C6 to C8 show that insufficient amounts of non-ionic surfactants, in this case below 1% by weight, have inadequate action in preventing plasticizer loss, in particular in the case of a PVB with relatively high PVOH content of 20.5% by weight. However, even these examples showed less plasticizer loss than example C1 without the addition of non-ionic surfactants.

TABLE 1

| Mixing specification | E1 | E2 | E3 | E4 | E5 | E6 | E7 | E8 | E9 | E10 |
| --- | --- | --- | --- | --- | --- | --- | --- | --- | --- | --- |
| PVB [% by weight] | 72 | 72 | 74 | 70 | 72 | 72 | 72 | 72 | 72 | 72 |
| PVOH content of PVB [% by weight] | 20.3 | 20.7 | 20.6 | 20.6 | 20.5 | 20.5 | 20.5 | 20.5 | 20.1 | 20.1 |
| 3G8 [% by weight] | 24 | 24 | 22.3 | 25.7 | 24 | 24 | 24 | 24 | 26 | 22 |
| Marlophen NP 6 | 4 | 4 | 3.7 | 4.3 | — | — | — | — | — | — |
| Isofol 12 + 4 EO | — | — | — | — | — | — | 4 | — | — | — |
| Isofol 18T + 6 EO | — | — | — | — | — | — | — | 4 | — | — |
| Marlipal O 13/40 | — | — | — | — | 4 | — | — | — | — | — |
| Marlipal O 13/60 | — | — | — | — | — | 4 | — | — | — | — |
| Isofol 12 + 5 EO | — | — | — | — | — | — | — | — | 2 | 6 |
| Berol 840 | — | — | — | — | — | — | — | — | — | — |
| 3G7 [% by weight] | — | — | — | — | — | — | — | — | — | — |
| Bleed-out observed after 30 days | no | no | no | no | no | no | no | no | no | no |

TABLE 2

| Mixing specification | C1 | C2 | C3 | C4 | C5 | C6 | C7 | C8 |
| --- | --- | --- | --- | --- | --- | --- | --- | --- |
| PVB [% by weight] | 74 | 74 | 66.9 | 69.5 | 71.5 | 72 | 72 | 72 |
| PVOH content of PVB [% by weight] | 20.2 | 20.2 | 18.9 | 18.9 | 18.9 | 20.5 | 20.5 | 20.5 |
| 3G8 [% by weight] | 26 | 22 | 33.1 | 30.5 | 28.5 | 27.5 | 27.8 | 27.8 |
| Marlophen NP 6 | — | — | — | — | — | — | — | — |
| Isofol 12 + 4 EO | — | — | — | — | — | — | — | 0.2 |
| Isofol 18T + 6 EO | — | — | — | — | — | — | — | — |
| Marlipal O 13/40 | — | — | — | — | — | — | — | — |
| Marlipal O 13/60 | — | — | — | — | — | — | — | — |
| Isofol 12 + 5 EO | — | — | — | — | — | — | — | — |
| Berol 840 | — | — | — | — | — | 0.5 | 0.2 | — |
| 3G7 [% by weight] | — | 4 | — | — | — | — | — | — |
| Bleed-out observed after 30 days | yes | yes | yes | yes | no | yes | yes | yes |

What is claimed is:

1. A plasticized foil based on a partially acetalized polyvinyl alcohol and suitable as an intermediate layer in a laminated safety glass, comprising:
    a) 60–85% by weight of partially acetalized polyvinyl alcohol,
    b) 14–39% by weight of a plasticizer, and
    c) 1–10% by weight of one or more non-ionic surfactants as an additive increasing the solubility of the plasticizer in the partially acetalized polyvinyl alcohol, wherein all weight percents are based on the total foil.

2. The foil as claimed in claim 1, wherein the ratio of the plasticizer to the non-ionic surfactant—based on the parts by weight in the foil—is greater than 2.7:1.

3. The foil as claimed in claim 1, wherein the amount of the plasticizer is sufficient to be incompatible with the partially acetalized polyvinyl alcohol without addition of the non-ionic surfactant.

4. The foil as claimed in claim 1, wherein the amount of the non-ionic surfactant(s) is 2–4% by weight, based on the total foil.

5. The foil as claimed in claim 1, wherein the partially acetalized polyvinyl alcohol comprises a partially butyralized polyvinyl alcohol with a polyvinyl alcohol content >19.5% by weight.

6. The foil as claimed in claim 1, wherein the plasticizer comprises triethylene glycol di-2-ethylhexanoate.

7. The foil as claimed in claim 1, wherein the non-ionic surfactant comprises a polyethoxylated aliphatic or aromatic alcohol having at least 6 carbon atoms in its alcohol fraction, with an average degree of ethoxylation greater than or equal to 2.

8. The foil as claimed in claim 7, wherein the non-ionic surfactant comprises a polyethoxylated aliphatic or aromatic alcohol having 8–20 carbon atoms in its alcohol fraction, with an average degree of ethoxylation of 3–10.

9. A laminated safety glass, comprising at least one glass pane and at least one foil as claimed in claim 1 adjoining this glass pane.

10. A process for increasing the solubility of a plasticizer in a partially acetalized polyvinyl alcohol, comprising adding to the partially acetalized polyvinyl alcohol one or more non-ionic surfactants of a polyethoxylated aliphatic or an aromatic alcohol containing at least 6 carbon atoms in the alcohol fraction, with an average degree of ethoxylation greater than or equal to 2 with an average degree of ethoxylation of 3–10.

11. A process according to claim 10, wherein the plasticizer is triethylene glycol di-2-ethylhexanoate.

12. A process according to claim 10, wherein the amount of non-ionic surfactants is 2–10%, based on a total foil.

13. A process according to claim 10, wherein the polyethoxylated aliphatic or aromatic alcohol contains 8–20 carbon atoms in the alcohol fraction.

14. A plasticized foil based on a partially acetalized polyvinyl alcohol for an intermediate layer in a laminated safety glass, comprising:

a) 60–85% by weight of partially acetalized polyvinyl alcohol,
b) 14–39% by weight of a plasticizer, and
c) 1–10% by weight of one or more non-ionic surfactants as an additive increasing the solubility of the plasticizer in the partially acetalized polyvinyl alcohol, wherein all weight percents are based on the total foil and the ratio of plasticizer to the non-ionic surfactant is greater than 2.7:1 based on the parts by weight in the foil.

15. The foil as claimed in claim 1, wherein the amount of the non-ionic surfactant(s) is 1–9% by weight, based on the total foil.

16. The foil as claimed in claim 1, wherein the ratio of the plasticizer to the non-ionic surfactant—based on the parts by weight in the foil—is greater than 3:1 but less than 10:1.

* * * * *